(12) United States Patent
Sakamoto et al.

(10) Patent No.: US 11,561,527 B2
(45) Date of Patent: *Jan. 24, 2023

(54) NC PROGRAM CONVERSION PROCESS METHOD AND PROCESSING TREATMENT SYSTEM

(71) Applicant: Hitachi, Ltd., Tokyo (JP)

(72) Inventors: Eiji Sakamoto, Tokyo (JP); Ippei Kono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,365

(22) Filed: May 20, 2022

(65) Prior Publication Data

US 2022/0276631 A1 Sep. 1, 2022

Related U.S. Application Data

(63) Continuation of application No. 17/056,794, filed as application No. PCT/JP2019/004866 on Feb. 12, 2019, now Pat. No. 11,340,581.

(30) Foreign Application Priority Data

Jun. 4, 2018 (JP) ................................ 2018-106639

(51) Int. Cl.
*G05B 19/408* (2006.01)
*G05B 19/406* (2006.01)
*G05B 19/4155* (2006.01)

(52) U.S. Cl.
CPC ....... *G05B 19/4083* (2013.01); *G05B 19/406* (2013.01); *G05B 19/4155* (2013.01); *G05B 2219/31466* (2013.01)

(58) Field of Classification Search
None
See application file for complete search history.

(56) References Cited

U.S. PATENT DOCUMENTS

| 11,340,581 B2 * | 5/2022 | Sakamoto .......... G05B 19/4155 |
| 2003/0170085 A1 | 9/2003 | Kakino et al. |

(Continued)

FOREIGN PATENT DOCUMENTS

| JP | 62-99052 A | 5/1987 |
| JP | 3-131456 A | 6/1991 |

(Continued)

OTHER PUBLICATIONS

International Search Report (PCT/ISA/210) issued in PCT Application No. PCT/JP2019/004866 dated May 21, 2019 with English translation (seven (7) pages).

(Continued)

*Primary Examiner* — Ryan A Jarrett
(74) *Attorney, Agent, or Firm* — Crowell & Moring LLP

(57) ABSTRACT

The present invention makes it possible to convert an NC program used for one processing into an NC program capable of securing appropriate processing accuracy in another processing machine. Provided is an NC program conversion process method by a conversion system which converts a conversion source NC program for executing a processing in a conversion source processing machine into a conversion destination NC program for executing a processing in a conversion destination processing machine, wherein an input of information relating to (1) stiffness of the conversion destination processing machine or (2) stiffness of the tool included in a conversion destination toolset is received, and on the basis of the received information relating to the stiffness, a conversion source NC program 1424 is converted into a conversion destination NC program 1425.

3 Claims, 4 Drawing Sheets

(56) References Cited

U.S. PATENT DOCUMENTS

2015/0127139 A1   5/2015  Bolin et al.
2016/0132622 A1   5/2016  Patel
2017/0193145 A1   7/2017  Patel

FOREIGN PATENT DOCUMENTS

| JP | 5-241637 A | 9/1993 |
| JP | 6-39681 A | 2/1994 |
| JP | 2002-366212 A | 12/2002 |
| JP | 2003-263208 A | 9/2003 |
| JP | 2011-237885 A | 11/2011 |
| JP | 2011-242905 A | 12/2011 |
| JP | 2015-97085 A | 5/2015 |
| WO | WO 98/19820 A1 | 5/1998 |

OTHER PUBLICATIONS

Japanese-language Written Opinion (PCT/ISA/237) issued in PCT Application No. PCT/JP2019/004866 dated May 21, 2019 (six (6) pages).

Japanese-language Office Action issued in Japanese Application No. 2018-106639 dated Jun. 28, 2022 with English translation (10 pages).

\* cited by examiner

NC PROGRAM CONVERSION PROCESS METHOD AND PROCESSING TREATMENT SYSTEM

CROSS REFERENCE TO RELATED APPLICATIONS

This application is a continuation of U.S. patent application Ser. No. 17/056,794, filed Nov. 19, 2020, which is a 371 of International Application No. PCT/JP2019/004866, filed Feb. 12, 2019, which claims priority from Japanese Patent Application No. 2018-106639, filed Jun. 4, 2018, the disclosures of which are expressly incorporated by reference herein.

TECHNICAL FIELD

The present invention relates to a technique of converting an NC program for numerical control (NC).

BACKGROUND ART

In recent years, a workpiece is machine-processed by inputting an NC program to an NC machine tool.

For example, PTL 1 discloses a technique of correcting a feed rate on the basis of a cutting resistance applied to an end mill by performing trial cutting before starting cutting of a workpiece for the purpose of making cutting resistance uniform in order to reduce wear or damage of the end mill attached to an NC machine tool. According to the technique of PTL 1, it is considered that, with it, it is possible to deal with a case where the physical properties of a workpiece are different from the nominal physical properties and deal with variation in the characteristics of the cutting edge of the end mill.

CITATION LIST

Patent Literature

PTL 1

Japanese Patent Application Publication No. 2002-366212

SUMMARY OF INVENTION

Technical Problem

For example, when a cutting target workpiece is machine-processed using an NC machine tool (hereinafter sometimes referred to simply as a processing machine), a CAM program is executed to generate an NC program to be input to an NC controller that controls the NC machine tool on the basis of CAD shape data of a target object. In this case, in order to improve the processing accuracy of the target object, the NC program is sometimes tuned according to an NC machine tool used actually for the NC program, for example.

On the other hand, it may be necessary to perform machine-processing to obtain the same target object by using another NC machine tool. In such a case, even if an NC program tuned for a certain NC machine tool is used, as it is, for controlling the other NC machine tool, there is a possibility that the desired processing accuracy for the target object is not obtained.

With the foregoing in view, an object of the present invention is to provide a technique capable of converting an NC program used in one processing machine to an NC program capable of securing appropriate processing accuracy in another processing machine.

Solution to Problem

An NC program conversion method according to an aspect is a NC program conversion method executed by a conversion system of a processing system including: a conversion source environment including a conversion source processing machine that executes a first machining processing according to a conversion source NC program and has a tool magazine and a conversion source toolset including one or more tools, used when the first machining processing has been executed using the conversion source processing machine; a conversion destination environment including a conversion destination processing machine having a tool magazine and a conversion destination toolset including one or more tools, to be used when a second machining processing is executed using the conversion destination processing machine; and the conversion system that converts the conversion source NC program to a conversion destination NC program used for executing the second machining processing, the method comprising: receiving input of information relating to (1) stiffness of the conversion destination processing machine or (2) stiffness of the tool included in the conversion destination toolset; and performing a first conversion process of converting the conversion source NC program to the conversion destination NC program on the basis of the received information relating to the stiffness.

Advantageous Effects of Invention

According to the present invention, it is possible to convert an NC program used in one processing machine to an NC program capable of securing appropriate processing accuracy in another processing machine.

DESCRIPTION OF EMBODIMENTS

Hereinafter, an embodiment will be described with respect to the drawings. The embodiment to be described later does not limit the invention according to the claims, and the components described in the embodiment and all of the combinations thereof are not necessarily essential to the solving means of the invention.

<System Configuration>

Figure 1:
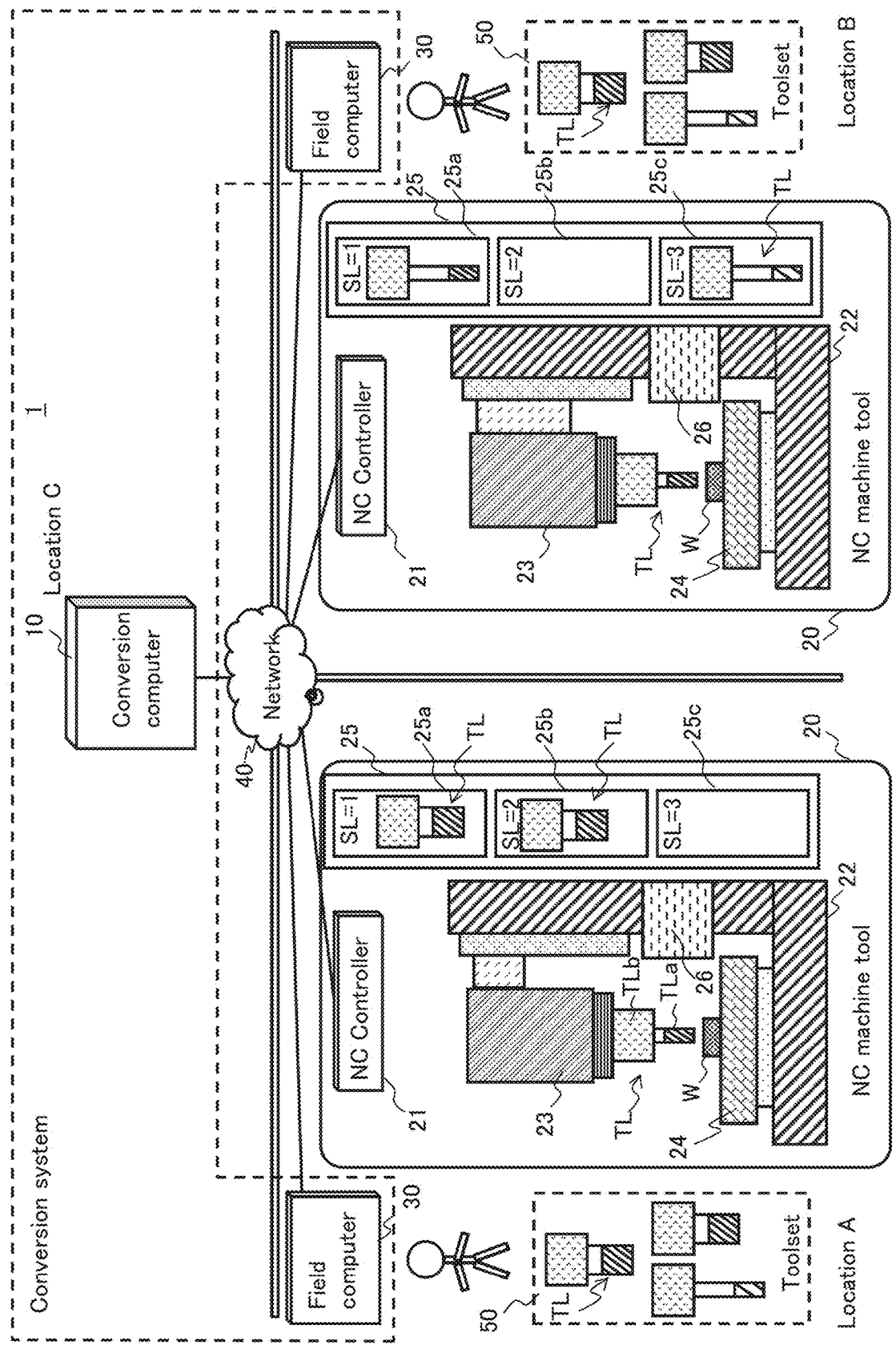
FIG. 1 is a diagram illustrating an entire configuration of a processing system according to an embodiment.

FIG. 1 is a diagram illustrating an entire configuration of a processing system according to an embodiment.

A processing system 1 includes a conversion computer 10, a plurality of NC machine tools 20 (an example of a processing machine) and a plurality of field computers 30. The conversion computer 10, the plurality of NC machine tools 20, and the plurality of field computers 30 are coupled via a network 40. The network 40 may be a wired network or a wireless network. In the present embodiment, the NC machine tool 20 and the field computer 30 are disposed in locations A and B, respectively, and the conversion computer 10 is disposed in a location C. The conversion computer 10 may be disposed at either the location A or B. Moreover, the plurality of NC machine tools 20 and the plurality of field computers 30 may be disposed at the same location.

The conversion computer 10 executes a process of converting an NC program (a conversion source NC program) for a certain NC machine tool 20 to an NC program (a conversion destination NC program) for another NC machine tool 20. The details of the conversion computer 10 will be described later.

The field computer 30 is a computer operated by an operator in the field and is configured with a PC (Personal Computer) including a processor, storage resources, and the like, for example. In FIG. 1, a typical example of the field mentioned herein is a location (for example, inside a plant, a building, a floor, or the like) where the NC machine tool 20 is provided. However, when the field computer 30 is used as a computer for displaying a screen of the conversion computer 10, the field computer 30 may be used in a location other than the location where the NC machine tool 20 is provided.

In the following description, an example in which the field computer 30 is responsible for downloading a converted NC program, displaying the screen of the NC program, and displaying screens such as a conversion input screen and the conversion computer 10 is responsible for performing an actual conversion process will be described. However, the roles (including partial roles) assigned to the respective computers may be exchanged or integrated with each other although the convenience may decrease to some extent. The conversion computer 10 may include a plurality of computers. Therefore, in the following description, a term "conversion system" is sometimes used. This system is a system that includes one or more computers (field computers 30 or conversion computers 10) and performs processing performed by the conversion computer 10 and the field computer 30 to be described later.

The NC machine tool 20 is a machining center, for example, and includes a body unit 22 that executes a machining process, an NC controller 21 that controls the machining process of the body unit 22, and a tool magazine 25 as an example of an accommodation unit capable of accommodating the tools TL of one or more toolsets used in the body unit 22.

The tool magazine 25 has a plurality of slots (SL: 25*a*, 25*b*, 25*c*) each capable of accommodating one tool TL.

The NC controller 21 controls a machining process and a tool replacement process of the body unit 22 according to an NC program stored therein.

The body unit 22 includes a processing head unit 23, a stage 24, and a tool changer 26 as an example of a replacing unit. The processing head unit 23 includes a spindle to which the tool TL can be attached and which can rotate. The processing head unit 23 may be a spindle itself. The stage 24 can move while mounting a cutting target workpiece W serving as a machining target thereon. The tool changer 26 removes the tool TL from the processing head unit 23 and accommodates the tool TL in a vacant slot of the tool magazine 25. Moreover, the tool changer 26 takes the tool TL out of the slot of the tool magazine 25 and attaches the tool TL to the processing head unit 23. An example of the tool changer 26 is a change arm (also referred to as an ATC arm) of an automatic tool changer (ATC). The tool magazine 25 is a component of the automatic tool changer. The NC program can describe a series of commands (referred to as codes or words in which parameters are added to codes in the term of an NC program) meaning tool replacement commands therein, and the tool replacement commands include a slot number indicating the position of a slot (the meaning thereof will be described later) in the tool magazine 25. The tool changer 26 takes the tool TL out of the slot designated by the slot number included in the parameters of the tool replacement commands according to the instructions of the NC controller 21 having read the tool replacement commands and attaches the tool TL to the processing head unit 23.

In the NC machine tool 20, although there is a limit on the number of tools TL accommodatable in the tool magazine 25, it is possible to cope with various machining processes by preparing one or more toolsets 50 in advance and changing the toolset to be accommodated in the tool magazine 25 according to a machining process to be executed.

In the present embodiment, the tool TL includes a blade TLa such as an end mill, a drill, a bite, and the like for cutting the workpiece W and a holder TLb for attaching the blade TLa to the processing head unit 23. However, for example, when the blade TLa can be attached to the processing head unit 23 as it is, the tool TL may not include the holder TLb and may include at least the blade TLa.

In the following description, an environment including at least a processing machine that has performed machining using a conversion target NC program (that is, a conversion source NC program) and a toolset corresponding to the processing machine is sometimes referred to as a "conversion source environment". Moreover, an environment including at least a processing machine scheduled to perform machining using a converted NC program (that is, a conversion destination NC program) and a toolset corresponding to the processing machine is sometimes referred to as a "conversion destination environment". The conversion source environment and the conversion destination environment each may include a physical or logical environment (for example, the temperature, a temperature sensor, the humidity, a humidity sensor in that location, or a floor where a processing machine is provided in that location, and a building that forms the location) included in each location. The "toolset corresponding to the processing machine" includes a toolset which is likely to be used by being stored in the tool magazine in the future in addition to a toolset stored in the tool magazine of the processing machine. Typically, a toolset corresponding to the processing machine is provided in the same location as the processing machine.

Next, the conversion computer 10 will be described in detail.

Figure 2:
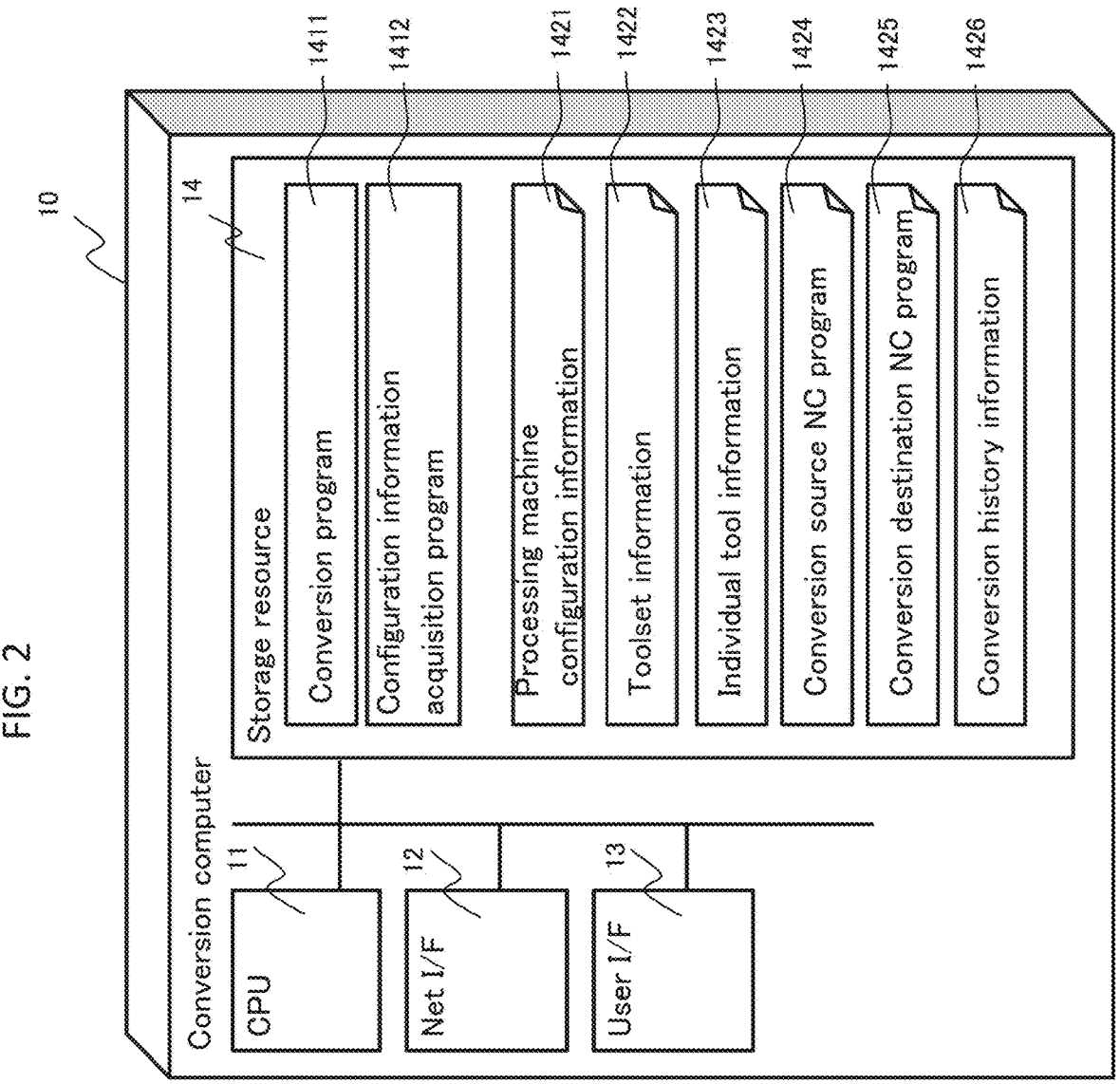
FIG. 2 is a diagram illustrating a configuration of a conversion computer according to an embodiment.

FIG. 2 is a diagram illustrating a configuration of a conversion computer according to an embodiment.

<<Hardware>>

The conversion computer 10 is a personal computer or a general-purpose computer, as an example. The conversion computer 10 includes a CPU 11 as an example of a processor, a network interface 12 (abbreviated as Net I/F in the drawing), a user interface 13 (abbreviated as User I/F in the drawing), a storage resource 14 as an example of a storage unit, and an internal network coupling these components.

The CPU 11 can execute programs stored in the storage resource 14. The storage resource 14 stores a program to be executed by the CPU 11, various pieces of information used by this program, an NC program used by the NC machine tool 20, and the like. The storage resource 14 may be a semiconductor memory, a flash memory, a HDD (Hard Disk Drive), a SSD (Solid State Drive), or the like, for example, and may be a volatile memory or a nonvolatile memory.

The network interface 12 is an interface for communicating with an external device (for example, the field computer 30, the NC controller 21 of the NC machine tool 20, and the like) via the network 40.

The user interface 13 is a touch panel, a display, a keyboard, a mouse, and the like, for example, and may be another device as long as it can receive operations from an operator (user) and display information. The user interface 13 may include a plurality of these devices.

<<Data and the Like>>

The storage resource 14 stores processing machine configuration information 1421, toolset information 1422, individual tool information 1423, a conversion source NC program 1424, a conversion destination NC program 1425, and conversion history information 1426. The storage resource 14 may store other information. The details of data and programs will be described in the following paragraphs.

Processing machine configuration information 1421. The processing machine configuration information 1421 is configured as a table storing information related to the respective NC machine tools 20, for example. The processing machine configuration information 1421 includes respective pieces of information illustrated below for each NC machine tool 20.

(a1) Identifier (processing machine ID) of NC machine tool 20. An identifier of the NC controller 21 or the network address of the NC controller 21 may be substituted as the processing machine ID.

(a2) Model number of NC machine tool 20.

(a3) Installation location of NC machine tool 20.

(a4) Use record (for example, use time or the like) of NC machine tool 20.

(a5) Temperature of prescribed portion of NC machine tool 20. The prescribed portion may be a spindle of the NC machine tool 20 or the stage 24.

(a6) Information (for example, Young's modulus of the portion, deflection amount, or the like) related to stiffness of prescribed portion of NC machine tool 20. The prescribed portion may be the spindle of the processing head unit 23 of the NC machine tool 20 or the stage 24.

(a7) Shape of prescribed portion of NC machine tool 20. The shape of the prescribed portion may be the length of the spindle of the NC machine tool 20 or the length of the stage 24.

(a8) Largest number of tools (that is, slots) accommodatable in tool magazine 25.

(a9) Offset value set according to aging or installation environment. This offset value is a value used for finely correcting the coordinates during movement of tools in an NC program and is a value used for correcting a situation where the stage is tilted due to aging, for example.

(a10) Manufacturer, model number, or the like of NC controller 21. The description format of NC program of the NC controller 21 may differ slightly depending on the manufacturer or the model number, and this information is used to determine such a situation.

(a11) Rattling, movement accuracy (for example, a backlash amount or the like of the stage), linearity, flatness, parallel mobility, and vibration width and frequency during operation of the machine, of components such as the spindle or stage.

In the present embodiment, the information of (a1), (a2), (a4), (a5), (a8), (a9), and (a10) is acquired from the NC controller 21 of the NC machine tool 20, for example, and the information of (a3), (a6), (a7), and (a11) is acquired from the information input by an operator. A method of acquiring the information is not limited thereto, and at least some of the pieces of information of (a1), (a2), (a4), (a5), (a8), (a9), and (a10) may be acquired from the information input through the user interface 13 by an operator, and the information acquirable from the NC controller 21 among the pieces of information of (a3), (a6), (a7), and (a11) may be acquired from the NC controller 21. The information described as being acquired from the NC controller 21 may be acquired from another device (for example, another computer, or a sensor itself).

Tool information (toolset information 1422 and individual tool information 1423)

The toolset information 1422 is information for managing a group (set) composed of one or more tools TL. The toolset information 1422 is a set of identification information (toolset ID) of a toolset and the identifiers or the model numbers of one or more tools TL forming the set.

The individual tool information 1423 is information related to each tool. The individual tool information 1423 includes pieces of information illustrated below.

(b1) Identifier (tool ID: for example, serial number or the like) of tool TL. The identifier of the tool TL may be the value of an individual ID assigned to the blade TLa or the holder TLb and may be assigned automatically by the CPU 11 executing a configuration information acquisition program 1412 when the individual ID is not assigned.

(b2) Model number (an example of tool identification information) of tool TL (for example, model numbers of blade TLa and holder TLb that form the tool TL). Only the model number of the blade TLa is sufficient when the tool TL is composed of the blade TLa only. When the blade TLa is composed of a plurality of parts, the model numbers of all parts may be used or some model numbers may be used.

(b3) Material, shape, stiffness (Young's modulus, deflection amount, or the like), use history, temperature, or the like of tool TL (i.e., blade TLa and holder TLb). In this case, since the stiffness changes depending on the material and the shape of the tool TL, these pieces of information are also information related to stiffness. Unless specified otherwise, the "shape" includes typical values obtained from a shape such as a length, the length (blade protrusion length) of the blade TLa protruding from the holder TLb, the thickness of the blade TLa, and the linearity of the blade TLa as well as the generally-known three-dimensional shape or cross-sectional shape indicated by a drawing or CAD data.

(b4) Information (position information, slot number) of arrangement position (slot) of tool magazine 25 in which tool is to be accommodated.

In the present embodiment, the information of (b1) to (b4) is acquired from the information input via the user interface 13 by an operator, for example, information that can be acquired from the NC controller 21 may be acquired from the NC controller 21.

The conversion source NC program 1424 is an NC program used for machining processing in the NC machine tool 20 (referred to as a conversion source NC machine tool 20) of a conversion source. The conversion source NC program 1424 is sometimes tuned according to the characteristics, the state, and the like of the conversion source NC machine tool 20 in order to maintain the processing accuracy of a target object obtained by the machining processing of the conversion source NC machine tool 20 to prescribed accuracy.

Conversion destination NC program 1425 is an NC program obtained by converting the conversion source NC program 1424 so as to comply with an NC machine tool 20

(referred to as a conversion destination NC machine tool 20) of a conversion destination. The conversion destination NC program 1425 is not present when a conversion process is not performed on any conversion source NC program 1424.

The conversion history information 1426 is information for managing the history of a conversion process when the conversion source NC program 1424 is converted to the conversion destination NC program 1425. The conversion history information 1426 is information in which identification information for identifying a conversion process is correlated with various pieces of information (input information and the like) used during the conversion process, for example.

In addition to these pieces of information, the storage resource 14 may store the following information.

Workpiece W information. This information is information such as, for example, shape data before machining of a workpiece W, a material, stiffness, or machining target shape data of the workpiece W. The machining target shape data is data indicating the target shape when a workpiece is machined by an NC program. When the workpiece W can be machined in the target shape, it means that the error is zero.

Information on pre-conversion environment or conversion destination environment other than processing machine configuration information 1421, toolset information 1422, and individual tool information 1423. In order to specify this information, this information is sometimes referred to as "other pre-conversion environment information" or "other pre-conversion environment information".

<Program Operating in Conversion Computer>
<<Conversion Program 1411>>

The conversion program 1411 executes the following processes by being executed by the CPU 11. In this case, when the CPU 11 executes the conversion program 1411, a conversion unit is formed.

When a conversion start button 120 in a conversion input screen 100 (see FIG. 3) to be described later is pressed, the conversion program 1411 reflects various pieces of information input to the conversion input screen 100 to the processing machine configuration information 1421, the toolset information 1422, and the individual tool information 1423 and performs a conversion process of converting the conversion source NC program 1424 of a conversion target to a conversion destination NC program 1425 on the basis of various pieces of information input to the conversion input screen 100 and the conversion destination environment information or the conversion source environment information included in the processing machine configuration information 1421, the toolset information 1422, and the individual tool information 1423 and stores the obtained conversion destination NC program 1425 in the storage resource 14.

In the conversion process of converting the conversion source NC program 1424 to the conversion destination NC program 1425, for example, the conversion program 1411 creates data in which the commands of the conversion source NC program 1424 are changed or added on the basis of information on the stiffness of the conversion destination NC machine tool 20 or the stiffness of the tool TL of the toolset 50 used in the conversion destination NC machine tool 20 as the conversion destination NC program 25. The added or changed commands may be tool diameter correction, tool length correction, tool wearing correction, a feed rate or a cutting speed so that a dramatical change in machining operations such as an increase in the number of machining times for the workpiece W by the tool TL is avoided. However, such a command (for example, a command corresponding to trial cutting) that increases the number of machining times for the workpiece W may be added.

In the conversion process of converting the conversion source NC program 1424 to the conversion destination NC program 1425, when the description format of an NC program is at least partially different between the NC controller 21 of the conversion source NC machine tool 20 and the NC controller 21 of the conversion destination NC machine tool 20, the conversion program 1411 converts the different portion in the description format of the description of the conversion source NC program to a description format for the NC controller 21 of the conversion destination NC machine tool 20. In this way, a machining process can be performed without any problem in the NC controller 21 of the conversion destination NC machine tool 20.

The conversion program 1411 may describe in the conversion destination NC program 1425, the processing machine ID of the conversion destination NC machine tool 20, the model number (or an identifier) of each tool TL of the toolset designated to be used in the conversion destination NC machine tool 20, and the arrangement position information (slot number) of each tool TL as comments. For example, "MC2:SL1:ML7x, . . . " may be described as comments. In this case, MC2 is a processing machine ID, SL1 is a slot number, and ML7x is a model number of a mill. By referring to these comments, the operator can understand which NC machine tool 20 is target for the conversion destination NC program 1425 and which tool is to be stored in which slot. Moreover, the use of each tool TL designated to be used and the arrangement position information of each tool TL may be described in the conversion destination NC program 1425 as comments. When such comments are added, although the data amount of the conversion destination NC program 1425 may increase, since the comments can be always managed integrally with a conversion destination NC program, it is possible to reduce a possibility that an unexpected NC machine tool 20 or tool TL is used mistakenly. In the following description, the comments described in this paragraph are sometimes referred to as "conversion destination device or tool comments".

The conversion program 1411 stores an ID (a conversion history ID) of a conversion process in the conversion destination NC program 1425 as comments and stores conversion history information 1426 in which the conversion history ID and various pieces of information input to the conversion input screen 100 are correlated in the storage resource 14. By comparing the conversion history ID stored in the conversion destination NC program 1425 as comments with the conversion history information 1426, it is possible to grasp various values considered at the time of conversion and investigate the cause when the accuracy of the machining process by the conversion destination NC program 1425 is not sufficient. In the following description, such comments as used in this paragraph are sometimes referred to as "history comments".

Multiple conversion processes may be performed by the conversion program 1411. For example, it is a case in which it is desired to further convert the conversion destination NC program 1425 converted in the first time to an NC program for another NC machine tool 20 or toolset. In such a case, a number of "conversion destination device or tool comments" and "history comments" corresponding to the multiplicity of the conversion may be present in the conversion destination NC program 1425. However, it is desirable that only the comments generated by the last conversion are left and the comments earlier than the last comments are deleted.

This is because particularly for the "conversion destination device or tool comments", an operator should see only the comments generated in the last conversion.

The conversion program 1411 displays a download confirmation screen 200 (see FIG. 4) to be described later after the conversion process is performed, and when a download button 210 is pressed, transmits the conversion destination NC program 1425 to the NC controller 21 of the conversion destination NC machine tool 20 or the field computer 30 at the location where the conversion destination NC machine tool 20 is present.

<<Configuration Information Acquisition Program 1412>>

The configuration information acquisition program 1412 executes the following processes by being executed by the CPU 11. In this case, when the CPU 11 executes the configuration information acquisition program 1412, a stiffness information receiving unit is formed.

The configuration information acquisition program 1412 acquires various pieces of information related to the NC machine tool 20 from the NC controller 21. Examples of the acquired information include the information of (a1), (a2), (a4), (a5), (a8), (a9), and (a10).

The configuration information acquisition program 1412 displays the conversion input screen 100 on the user interface 13 and acquires various pieces of information (the information ((a3), (a6), (a7), and (a11)) related to the NC machine tool 20 and the information ((b1) to (b4)) related to the toolset 50) from an operator via the conversion input screen 100.

When necessary information is not input in the conversion input screen 100 or the input information is not appropriate (the input information is outdated), the configuration information acquisition program 1412 displays an alert symbol ("!" or the like) near an input area of the information. When necessary information is not input or the input information is not appropriate, the configuration information acquisition program 1412 may display a conversion start button 120 on the conversion input screen 100 in a non-pressable state, for example, so that execution of a conversion process does not start. By doing so, when a conversion error occurs, it is possible to appropriately prevent execution of a conversion process.

The configuration information acquisition program 1412 executes a filtering process of setting the input value in a selective input region of a conversion destination environment to an appropriate value or narrowing down selection candidates selectable by pulldown on the basis of the information of the conversion source environment (that is, the information of the conversion source NC machine tool 20 and the information related to the toolset 50 of the conversion source NC machine tool 20). For example, the configuration information acquisition program 1412 narrows down toolsets having the same number of tools as the number of tools in the toolset selected in the conversion source environment as the selection candidates for the toolset in the conversion destination.

Next, the conversion input screen 100 displayed by the configuration information acquisition program 1412 will be described in detail <Conversion Input Screen>

Figure 3:
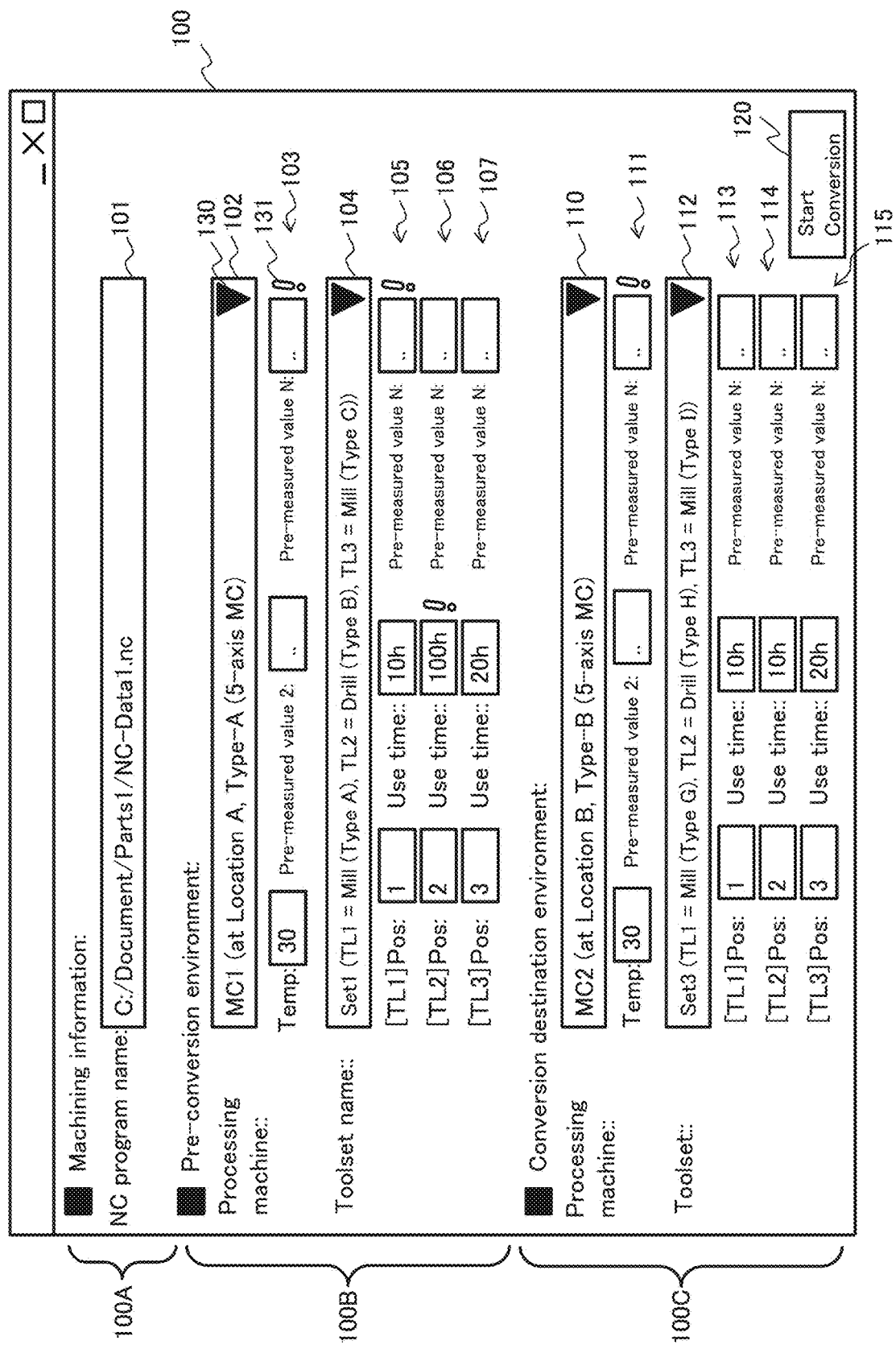
FIG. 3 is a diagram illustrating a configuration of a conversion input screen according to an embodiment.

FIG. 3 is a diagram illustrating a configuration of a conversion input screen according to an embodiment. The conversion input screen 100 includes the following drawing regions and is a screen including an input or display screen object in each region.

Pre-conversion environment region 100B. This region includes an input or display screen object of a pre-conversion environment.

Conversion destination environment region 100C. This region includes an input or display screen object of a conversion destination environment.

Machining information region 100A. This region includes an input or display screen object related to information independent from a pre-conversion environment and a conversion destination environment.

The machining information region 100A includes the following. In the following description, although a term "region" for display or input is used, this indicates a region including a display screen object or an input screen object.

File name input region 101 for inputting file name of conversion target (conversion source) NC program.

The pre-conversion environment region 100B includes the following.

Conversion source processing machine designation region 102 for selecting and designating processing machine ID or configuration information of conversion source NC machine tool 20.

Conversion source processing machine information input region 103 for inputting various pieces of information related to conversion source NC machine tool 20.

Conversion source toolset designation region 104 for selecting and designating toolset used in machining process according to conversion source NC program in conversion source NC machine tool 20.

Conversion source tool information input regions 105, 106, and 107 for inputting information related to each tool included in toolset.

The conversion destination environment region 100C includes the following.

Conversion destination processing machine designation region 110 for selecting and designating processing machine ID or configuration information of conversion destination NC machine tool 20.

Conversion destination processing machine information input region 111 for inputting various pieces of information related to conversion destination NC machine tool 20.

Conversion destination toolset designation region 112 for selecting and designating toolset used in machining process according to conversion destination NC program in conversion destination NC machine tool 20.

Conversion destination tool information input regions 113, 114, and 115 for inputting information related to each tool included in toolset.

Conversion start button 120 for receiving start of conversion process from conversion source NC program to conversion destination NC program.

The division of regions is an example. For example, the file name input region 101 may be regarded as a part of the pre-conversion environment together with the toolset TL in the conversion source environment and be included in the pre-machining environment region 100B, and conversely, may be included in the machining information 100A. In the drawing, the regions for inputting or displaying the "workpiece W information", the "other pre-conversion environment information", and "other conversion destination environment information" are not illustrated. However, these regions may be displayed in this screen so that information is received and information is displayed. The workpiece W information may be included in the region 100A. This is ideal when the workpiece W information changes little in each environment. On the other hand, when the pre-machining shape of the workpiece W is different in respective environments, the input or display region thereof may be included in the region 100B or the region 100C. A screen object for designating a file name in which shape data is stored may be used as the shape data as in the region 101 in FIG. 3.

The conversion source processing machine information input region 103 is a region for inputting information (conversion source processing machine request input information) that needs to be input by an operator (for example, the information of (a6), (a7), and (a11)) and displaying information acquired already to input correction information.

The conversion source tool information input regions 105, 106, and 107 are regions for inputting information (conversion source tool request input information) that needs to be input by an operator (for example, the information of (b3) and (b4)) and displaying information acquired already to input correction information. In the present embodiment, the conversion source tool information input region 105 is an input region corresponding to the tool of TL1 in the conversion source toolset designation region 104, the conversion source tool information input region 106 is an input region corresponding to the tool of TL2 in the conversion source toolset designation region 104, and the conversion source tool information input region 107 is an input region corresponding to the tool of TL3 in the conversion source toolset designation region 104.

The conversion destination processing machine information input region 111 is a region for inputting information that needs to be input by an operator (for example, the information of (a6), (a7), and (a11)) and displaying information acquired already to input correction information.

The conversion destination tool information input regions 113, 114, and 115 are regions for inputting information that needs to be input by an operator (for example, the information of (b3) and (b4)) and displaying information acquired already to input correction information. In the present embodiment, the conversion destination tool information input region 113 is an input region corresponding to the tool of TL1 in the conversion destination toolset designation region 112, the conversion destination tool information input region 114 is an input region corresponding to the tool of TL2 in the conversion destination toolset designation region 112, and the conversion destination tool information input region 115 is an input region corresponding to the tool of TL3 in the conversion destination toolset designation region 112. Although the position in the conversion destination tool information input regions 113, 114, and 115 indicates the position information (slot number) of the tool magazine 25 in which each tool is to be disposed, the slot number in which each tool is disposed may be set in advance to be the same as the slot number in which the same tool or the same type of tool in the conversion destination tool information input regions 113, 114, and 115 is disposed. The slot number in which each tool is disposed may be an arbitrary slot number input by an operator. In this case, it is necessary to appropriately dispose a corresponding tool in the slot of the input slot number.

In the conversion input screen 100, a pulldown button 130 for displaying selection candidates is disposed in the conversion source processing machine information input region 103, the conversion source toolset designation region 104, the conversion destination processing machine designation region 110, the conversion destination toolset designation region 112, and the like, and when the pulldown button 130 is pressed, selection candidates in the corresponding region are displayed in a selectable state.

In the conversion input screen 100, when no data is input to a region where an input is necessary or the information being displayed is information acquired a prescribed period before the present time, an alert symbol 131 is displayed. With this alert symbol 131, an operator can understand that information is insufficient or old and can understand that it is necessary to input necessary information and perform additional measurement.

Although it has been partially described hereinabove, the user of this screen may not input text to the pre-conversion environment region 100B and the conversion destination environment region 100C each time conversion is performed. For example, the conversion computer 10 may store information to be stored in the storage resource 14 in advance before displaying this screen, the information stored in advance may be displayed on this screen, and the information may be selected via the user interface 13. In such a case, some information related to the pre-conversion environment or the conversion destination environment may not be displayed on this screen. However, the alert symbol 131 may be displaced near (for example, next to) the text displayed inside the regions 102, 104, 110, and 112 to indicate that the information belonging to the corresponding processing machine or toolset is insufficient or old. With this indication, since the user of this screen can understand that conversion cannot be performed with the items selected before starting conversion or the processing accuracy after conversion may decrease even if conversion is performed, it is more preferable when the conversion process takes a lot of time.

Next, the download confirmation screen 200 displayed by the conversion program 1411 will be described in detail.

<Download Confirmation Screen>

Figure 4:
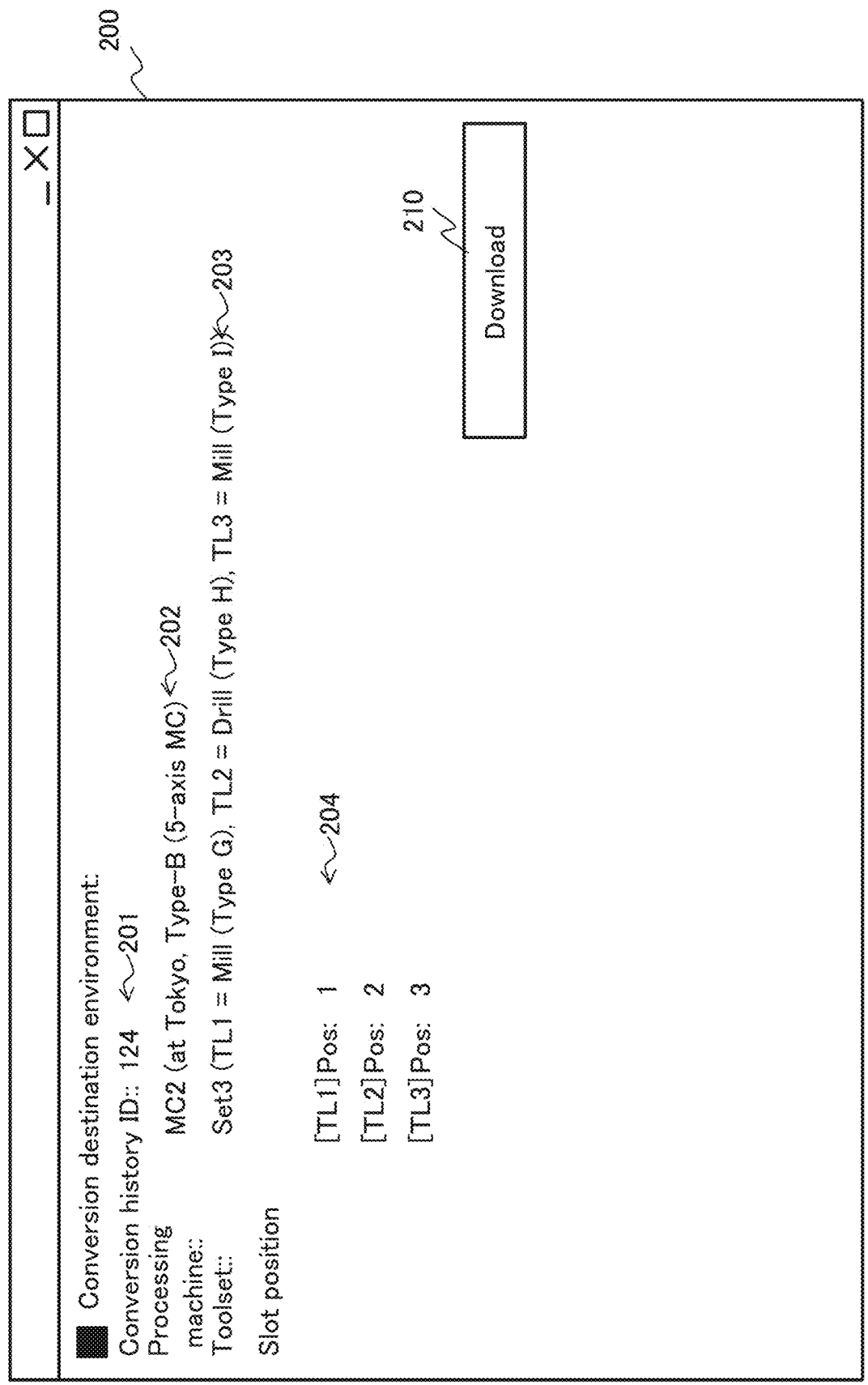
FIG. 4 is a diagram illustrating a configuration of a download confirmation screen according to an embodiment.

FIG. 4 is a diagram illustrating a configuration of a download confirmation screen according to an embodiment.

The download confirmation screen 200 includes a conversion history ID display region 201 for displaying a conversion history ID for identifying an executed conversion process, a conversion destination processing machine information display region 202 for displaying a processing machine ID or configuration information of the conversion destination NC machine tool 20, a conversion destination toolset display region 203 for displaying a toolset ID of a toolset used by the conversion destination NC machine tool 20 and a model number of the tool forming the toolset, a tool arrangement position display region 204 for displaying arrangement position information (slot number) of each tool in the tool magazine 25 of the conversion destination NC machine tool 20, and a download button 210 for receiving an instruction to download the conversion destination NC program 1425 to the NC controller 21 of the NC machine tool 20 or the field computer 30 at the location of the conversion destination.

According to this download confirmation screen 200, since the arrangement position information (slot number) of each tool in the tool magazine 25 of the conversion destination NC machine tool 20 is displayed, it is possible to appropriately prevent an operator from disposing the tool TL to be used in a wrong slot in the tool magazine 25.

To explain according to a specific situation, in a machining process, different tools may be used in a plurality of steps such as roughing, semi-finishing, and finishing. In this case, as described partially, the position information (slot number) of the tool magazine 25 that accommodates the tool used in each step is described in the NC program. Which tool of the tool magazine 25 will be disposed in which slot may be determined arbitrarily in each of the NC machine tools 20.

Therefore, tools for performing the same step by the conversion source NC machine tool 20 and the conversion destination NC machine tool 20 may be disposed in different slots numbers of the tool magazine 25. For example, when the conversion destination NC program that performed a conversion process assuming that the tool used for the same step in the conversion source and the conversion destination is disposed in the same slot number in the tool magazine 25 is used as it was, if different types of tool are accommodated in the same slot number, completely different tools are used and the workpiece W may be damaged or the tool TL may be damaged. Particularly, during busy periods or the like, tool arrangement errors are likely to occur and such a situation is likely to occur.

In contrast, as described above, according to the download confirmation screen 200, since the slot number of each tool in the tool magazine 25 of the conversion destination NC machine tool 20 is displayed, it is possible to prompt an operator to confirm whether the tool TL to be used is disposed in a wrong slot and prevent a situation where the tool TL is disposed in a wrong slot.

The download screen such as this screen may be integrated with the screen of FIG. 3. However, when the conversion process takes a lot of time, it is preferable that the download screen illustrated in FIG. 4 is provided separately from the conversion start button screen in FIG. 3. This is because after starting the conversion process, the user of the screen can close the screen and perform another operation. The advantages of dividing the other screens are as described in the present embodiment.

Next, a processing operation of the conversion computer 1 will be described.

(Process 1) The configuration information acquisition program 1412 (strictly speaking, the CPU 11 executing the configuration information acquisition program 1412) acquires various pieces of acquirable information (for example, (a1), (a2), (a4), (a5), (a8), (a9), and (a10)) related to the NC machine tools 20 from the NC controllers 21 of the NC machine tools 20 coupled via the network 40. This processing does not need to be performed every time the processing subsequent to Process 2 to be described later is performed.

(Process 2) Subsequently, the configuration information acquisition program 1412 displays the conversion input screen 100 (see FIG. 3) and receives the following designations via the conversion input screen 100.

Designation of conversion source NC program 1424 which is conversion target.

Designation of information (processing machine ID) for identifying NC machine tool 20 (conversion source NC machine tool) having performed machining process of workpiece W according to conversion source NC program 1424.

Designation of information (toolset ID) for identifying toolset used in machining process according to conversion source NC program 1424.

Designation of information (processing machine ID) for identifying new NC machine tool (conversion destination NC machine tool 20) for cutting workpiece W according to conversion destination NC program 1425 converted from the conversion source NC program 1424.

Designation of information (toolset ID) for identifying toolset used in conversion destination NC machine tool 20. In addition to the above, the configuration information acquisition program 1412 receives the input (directly input or selective input) of various pieces of information ((a3), (a6), (a7), and (a11)) related to the conversion source NC machine tool 20 and the conversion destination NC machine tool 20 and information (information of (b1) to (b4)) related to the toolset 50 used in the conversion source NC machine tool 20 and the toolset 50 used in the conversion destination NC machine tool 20.

(Process 3) When the conversion start button 120 is pressed, the configuration information acquisition program 1412 transmits a conversion start instruction to the conversion program 1411. In this case, the conversion start instruction includes various pieces of information input (directly input or selective input) to the conversion input screen 100.

(Process 4) Upon receiving the conversion start instruction, the conversion program 1411 reads the designated conversion source NC program 1424, converts the conversion source NC program 1424 to the conversion destination NC program 1425 on the basis of the information (at least information related to the stiffness of the conversion destination NC machine tool 20 or the stiffness of the toolset used in the conversion destination NC machine tool 20) included in the conversion start instruction, and stores the obtained conversion destination NC program 1425 in the storage resource 14.

(Process 5) Subsequently, the conversion program 1411 displays the download confirmation screen 200 (see FIG. 4). The download confirmation screen 200 may be displayed according to an operation of the user on the field computer 30 instead of being displayed automatically after Process 4 is completed. After that, when the download button 210 is pressed, the conversion program 1411 transmits the conversion destination NC program 1425 to the NC controller 21 of the conversion destination NC machine tool 20 or the field computer 30 at the location where the conversion destination NC machine tool 20 is present.

For example, when the conversion destination NC program 1425 is transmitted to the NC controller 21, the NC controller 21 stores the received conversion destination NC program 1425 and can execute the conversion destination NC program 1425 in the subsequent machining process. On the other hand, when the conversion destination NC program 1425 is transmitted to the field computer 30, the field computer 30 stores the conversion destination NC program 1425. After that, the conversion destination NC program 1425 of the field computer 30 is stored in the NC controller 21 via the network 40 or via a recording medium or the like, the conversion destination NC program 1425 can be executed by the NC controller 21.

<Operation and Effect>

According to the above-described process, since a conversion source NC program tuned for the conversion source NC machine tool 20 is converted to a conversion destination NC program by taking at least information related to stiffness of the conversion destination NC machine tool 20 into consideration, it is possible to improve the processing accuracy in the machining process of the conversion destination NC machine tool 20.

<Variation>

The present invention is not limited to the above-described embodiment but may be modified appropriately without departing from the spirit of the present invention. The processes described below may be used in combination.

<<Conversion Destination Environment Filtering Process>>

The filtering process of the configuration information acquisition program 1412 may involve the following processes.

Candidate for conversion destination NC machine tools (set candidate or selected candidate in conversion destination processing machine designation region 110)

For example, a candidate NC machine tool set as the conversion destination NC machine tool or narrowed down as the selected candidate may be another NC machine tool 20 including all functions of the conversion source NC machine tool 20. Specifically, for example, when the conversion source NC machine tool 20 is a milling machine or a drilling machine, the candidate NC machine tool may be a machining center. Moreover, when the conversion source NC machine tool is a three-axis machining center, the candidate NC machine tool may be a five-axis machining center.

The candidate NC machine tool set as the conversion destination NC machine tool or narrowed down as the selected candidate may be an NC machine tool that can execute all processing steps described in the conversion source NC program 1424. For example, even if the conversion source NC machine tool is a five-axis machining center, when all processing steps described in the conversion source CN program 1424 can be executed by a three-axis machining center, the candidate NC machine tool may be a three-axis machining center.

An NC machine tool 20 that can be loaded with a smaller number of tools than the number of tools used in the conversion source NC program 1424 may be excluded from the candidate NC machine tool.

Candidate for toolset (set candidate or selected candidate in conversion destination toolset designation region 112)

When the NC program conversion process is simplified, a conversion destination toolset candidate may be a toolset having the same number of tools as the number of tools of the conversion source toolset. From the perspective of processing accuracy, it may be preferable to use a toolset having the same number of tools as the conversion source toolset as a conversion destination toolset candidate. For example, this is because, when a number of steps including roughing, semi-finishing, and finishing are performed in that order using three tools in the conversion source, it is difficult to provide the same processing accuracy as the conversion source even when a number of steps including roughing, semi-finishing, and finishing are performed in that order using two tools. The use of each tool TL may be stored and a toolset including all uses of the tools TL included in the conversion source toolset may be used as a toolset candidate.

The conversion destination toolset candidate may be a toolset including the same type of tools as the tools of the conversion source toolset. Here, the same type may be the same use.

A toolset including a tool for which necessary information has not been acquired in advance may be excluded from the conversion destination toolset candidate.

<<Slot Number Conversion Process Based on Use Information of Tool TL>>

As a method for simplifying the conversion process by the conversion program 1411, an input rule of an operator may be set such that an operator who uses the screen of FIG. 3 inputs the same slot number as the tool of the conversion destination environment of the same use as the tool TL of the pre-conversion environment with respect to a tool TL included in the toolset of the conversion destination environment. Such a rule may not be observed due to an operator's error. As a countermeasure, the configuration information acquisition program 1412 may receive the input of the use (for example, roughing, semi-finishing, or finishing) of each tool TL included in the toolset, store the input information in the individual tool information 1423, and solve the problem using this information. Specifically, the program reads correspondence (referred to as Correspondence 1) between the use and the slot number of the selected tool TL included in the toolset of the conversion source environment and the use (conversion destination tool use) of the selected tool TL included in the toolset of the conversion destination environment, retrieves Correspondence 1 having the same use as the conversion destination tool use, and use the slot number of Correspondence 1 as the slot number of the conversion destination toolset.

<<Introduction of Temporary Slot Number Conversion Process>>

In the above-described embodiment, the conversion process of the conversion program 1411 is performed after which tool TL will be usable in which slot number in the conversion destination environment is determined. However, when the machining efficiency in the conversion destination environment is taken into consideration, there may be cases where it is desired to determine a slot in which each tool is to be stored dynamically after the conversion process is performed. For example, since a conversion process may take a long period of time (for example, one day), the relationship between a slot number and a tool TL cannot be determined at the time of starting conversion in order to dynamically convert other machining operations in the conversion destination environment although it is desired to start conversion immediately.

As a countermeasure, the conversion process of the conversion program 1411 may be performed regarding the slot number of each tool input or selected in the screen of FIG. 3 as a temporary slot number, and after that, a process (referred to as a temporary slot number conversion process) of converting the temporary slot number to an actual slot number may be performed. In the following description, a program that performs a temporary slot number conversion process is sometimes referred to as a temporary slot conversion program. The temporary slot number conversion process may be performed immediately before the download button 210 is pressed on the download screen in FIG. 4 to start downloading or may be executed by another program in the field computer 30 after the downloading. The temporary slot number and the conversion information (slot number conversion information) to the actual slot number which are information necessary for executing the temporary slot number conversion process are stored by being input by the operator to the conversion computer 10 or the field computer 30 after the conversion process is executed by the conversion program 1411 before the temporary slot number conversion process is executed. Although the temporary slot number is preferably a number, the temporary slot number may be another identifier. The introduction of the temporary slot number conversion process enables effective use of computer resources of the conversion computer 10 since the process of the conversion program 1411 which incurs a heavy load or a long period of time can be executed before determining which tool TL will be stored in each slot.

The temporary slot number assigned to the tool TL in the toolset selected as the conversion destination environment may be determined as follows before the conversion process of the conversion program 1411 starts. In any case, the determined relationship between the tool TL and the temporary slot number is stored in the individual tool information and is referred to during a slot number conversion process.

Arrangement order of tools TL in selected toolset. The arrangement order may be a display order, a data storage order, or an order based on steps, but there is no limitation thereto.

Assigned by "slot number conversion process based on use information of tool TL".

Although the input of the slot number conversion information may be realized by inputting the relationship between the temporary slot number and the actual slot number to the computer, it is difficult to input the same in a situation where the target tool TL of a temporary slot number is not known. Therefore, in a conversion information input screen, information on the tool TL to which a temporary slot number has been assigned may be displayed together on the conversion information input screen.

<<Another Use Form 1 of Field Computer>>

In the above-described embodiment, an example in which the conversion input screen 100 and the download confirmation screen 200 are displayed on the user interface 13 of the conversion computer 10 and inputs are received has been described. However, the present invention is not limited thereto, and the conversion input screen 100 and the download confirmation screen 200 may be on any field computer 30 to receive inputs, and for example, the screens may be displayed on the field computer 30 at the location where the conversion destination NC machine tool 20 is present to receive inputs. A part of the conversion input screen 100 may be displayed on the field computer 30 at the location where the conversion source NC machine tool 20 is present to receive inputs, and the remaining part of the conversion input screen 100 may be displayed on the field computer 30 at the location where the conversion destination NC machine tool 20 is present to receive inputs.

<<Another Conversion Process 1 by Conversion Program>>

The process of converting the conversion source NC program 1424 to the conversion destination NC program 1425 may be performed as follows.

(Step A1) Simulation of a physical phenomenon during machining is performed using the conversion destination environment information and the workpiece W information to predict the machining shape of the workpiece W. Conversion source environment information may be used during the simulation. The simulation may be performed by another program other than the conversion program 1411.

(Step A2) An error is calculated on the basis of comparison between the predicted shape of the workpiece W and the target shape of the workpiece W.

(Step A3) Descriptions (tool diameter correction, tool length correction, tool wearing correction, a feed rate, a cutting speed, and the like) for eliminating the error may be added or changed to the conversion source NC program 1424 and the conversion source NC program is stored as the conversion destination NC program 1425.

<<Another Conversion Process 2 by Conversion Program>>

The process of converting the conversion source NC program 1424 to the conversion destination NC program 1425 may be performed as follows. The steps below may be combined with Steps A1 to A3.

(Step B1) The conversion destination environment information, the workpiece W information, the conversion source environment information, and the target shape of the workpiece W are input to an artificial intelligence program to acquire an error. The machining shape after the workpiece W was machined using the conversion source NC program in the conversion source environment and the target shape may be input in advance as the training data of the artificial intelligence program together with the conversion source environment information. Moreover, the machining shape after the workpiece W was machined using an NC program other than the conversion destination NC program in the conversion destination environment and the target shape may be input in advance as another training data together with the conversion destination environment information. The artificial intelligence program may be performed by another program other than the conversion program 1411.

(Step B2) Descriptions (tool diameter correction, tool length correction, tool wearing correction, a feed rate, a cutting speed, and the like) for eliminating the error may be added or changed to the conversion source NC program 1424 and the conversion source NC program is stored as the conversion destination NC program 1425.

<<Division of Screens According to Operation Range of Operator>>

When the location A is relatively distant from the location B as in FIG. 1, different operators may be deployed in respective locations as illustrated in FIG. 1. In such a case, each operator may be responsible for performing processing according to the conversion source environment or the conversion destination environment included in the location where each operator is disposed, measuring the conversion destination environment information and the conversion source environment information described in FIGS. 2 to 4, and inputting the information to the conversion computer. As a screen ideal for such a case, the screen of FIGS. 3 and 4 may be divided as below. In the following description, although some description is provided using a screen as a subject, this is actually achieved when a CPU executes a program executed by each field computer.

<<<Conversion Source Environment Operating Computer>>>

The regions 100A (at least the NC program name 101) and 100B of FIG. 3 may be displayed on the conversion source environment operating computer 30. This is because the information to be input to these regions is obtained relatively often in a conversion source environment, it is efficient for the operator of the conversion source environment to input the information. However, it is not necessary to display all input regions included in the regions 100A and 100B of FIG. 3. The information input by the pre-conversion environment operating computer is stored in the conversion computer 10 by assigning a prescribed identifier (hereinafter sometimes referred to as a library name) thereto. These inputs are useful as information indicating that machining could be performed with an intended error in the pre-conversion environment.

<<<Conversion Destination Environment Operating Computer>>>

The region 100C in FIG. 3 may be displayed on the conversion destination environment operating computer. This is because information to be input in these regions is obtained relatively often in a conversion destination environment, it is efficient for the operator of the conversion destination environment to input the information. In order to call the content input by the conversion source environment operating computer 30, a region for designating the library name is included in the screen of the conversion destination environment operating computer. By doing so, it is possible to appropriately identify the input in the conversion source environment and identify the information necessary for the conversion process by the conversion program 1411. However, the conversion source environment information is not easily identified with the library name only, and it is difficult to input appropriate conversion destination environment information. Therefore, on the screen of the conversion destination environment operating computer, input information corresponding to the library name may be displayed after the library name is designated.

Hereinabove, an example of division of the display in the field computers of the conversion source environment and the conversion destination environment has been described. According to this example, the operator of the conversion source environment can create the conversion destination NC program 1425 executable in a plurality of conversion destination environments with one input operation. Moreover, even when the conversion source environment deteriorates due to aging, a library name before aging may be designated and the environment after aging may be input as the conversion destination environment.

<<<Others>>>

In the above-described embodiment, part or all of the processes performed by the CPU 11 may be performed by a hardware circuit. The program of the embodiment may be installed from a program source. The program source may be a program distribution server or a nonvolatile storage medium (for example, a portable storage medium).

The pre-conversion NC program may be an NC program before cutting is performed by a processing machine immediate after it was generated from the target shape data according to a CAM program. In this case, the toolset may be the tool data input when an NC program was generated by the CAM program.

Although a machining center has been described as an example of the processing machine in the above description, another processing machine may be used as long as it can perform NC control.

Although data transmission and reception between the field computer and the conversion computer was omitted partially in the above description, data is naturally transmitted and received between the field computer and the conversion computer. For example, when the conversion program 1411 is executed by the conversion computer, and the field computer displays the user interface and displays or inputs information by operating the user interface, a program that performs a part of the processing performed by the configuration information acquisition program is executed by the field computer. The program that performs the part of the processing transmits input information to the conversion computer and receives display information transmitted from the conversion computer and displays the user interface.

REFERENCE SIGNS LIST

1 Processing system
10 Conversion computer
11 CPU
12 Network interface
13 User interface
14 Storage resource
20 NC machine tool
21 NC controller
25 Tool magazine
25a, 25b, 25c Slot
26 Tool changer
30 Field computer
50 Toolset
W Workpiece
TL Tool

The invention claimed is:

1. A nonvolatile memory storing conversion program which is executed by a conversion system, the conversion program comprising codes of:
   receiving input of destination stiffness information relating to stiffness, the stiffness being at least one of:
   (1) stiffness of a conversion destination processing machine or
   (2) stiffness of a tool used by the conversion destination processing machine; and
   performing a conversion processing of converting a conversion source NC program to a conversion destination NC program on the basis of the destination stiffness information relating to stiffness,
   wherein, the conversion destination NC program is used by the conversion destination processing machine,
   wherein a conversion destination toolset is used by the conversion destination processing machine;
   in the conversion processing, and on the basis of the destination stiffness information relating to stiffness, adding or updating, at least one command relative to tool diameter correction, tool length correction, a feed rate, tool wearing correction, or a cutting speed; and
   wherein the destination stiffness information relating to stiffness includes:
   the stiffness of the conversion destination processing machine; and
   the stiffness of the tool used by the conversion destination processing machine.

2. The nonvolatile memory storing conversion program of claim 1, further comprising code of:
   preventing a start of the conversion processing in case when the destination stiffness information relating to stiffness is not received.

3. The nonvolatile memory storing conversion program of claim 1,
   wherein the conversion system at least includes a computer commonly used by a plurality of user.

* * * * *